(12) United States Patent
Taki (10) Patent No.: US 7,357,114 B2
(45) Date of Patent: Apr. 15, 2008

(54) SPLASH GUARD MECHANISM OF GEAR POSITION SENSOR FOR MOTORCYCLE

(75) Inventor: Masafumi Taki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/790,239

(22) Filed: Apr. 24, 2007

(65) Prior Publication Data
US 2007/0251346 A1    Nov. 1, 2007

(30) Foreign Application Priority Data
Apr. 27, 2006   (JP) .............................. 2006-122914

(51) Int. Cl.
*F02B 77/04* (2006.01)
(52) U.S. Cl. .............................. 123/198 E; 123/198 D
(58) Field of Classification Search ............ 123/198 E, 123/198 D, 195 R
See application file for complete search history.

(56) References Cited

U.S. PATENT DOCUMENTS 6,484,607 B2 * 11/2002 Shichinohe et al. ....... 192/3.31

FOREIGN PATENT DOCUMENTS

JP          7-230741 A       8/1995

* cited by examiner

*Primary Examiner*—Noah P. Kamen
(74) *Attorney, Agent, or Firm*—Birch, Stewart, Kolasch & Birch, LLP (57) ABSTRACT

A splash guard mechanism of a gear position sensor for a motorcycle protects the gear position sensor without providing a special cover. In an engine of a motorcycle where a gear position sensor that senses a shift stage selected by a shift drum protrudes sideways in the vicinity of a driving sprocket for driving a rear wheel by a crankcase that holds a crankshaft, a splash guard mechanism of the gear position sensor is configured by a splash guard formed on a sprocket cover that covers the driving sprocket from the side and arranged between the gear position sensor and the driving sprocket, and a rib protrudes from the reverse side of the driving sprocket with the gear position sensor between them in the crankcase.

20 Claims, 7 Drawing Sheets

SPLASH GUARD MECHANISM OF GEAR POSITION SENSOR FOR MOTORCYCLE

CROSS-REFERENCE TO RELATED APPLICATIONS

This nonprovisional application claims priority under 35 U.S.C. § 119(a) on Patent Application No. 2006-122914, filed in Japan on Apr. 27, 2006, the entirety of which is incorporated herein by reference.

BACKGROUND OF THE INVENTION

1. Field of the Invention:

The present invention relates to a splash guard mechanism provided on an engine of a motorcycle. In particular, the present invention relates to a splash guard for a gear position sensor for the motorcycle for protecting the gear position sensor from splashing mud during running of the motorcycle, stone, debris, etc.

2. Background of the Invention:

A shift drum that selects the shift stage of a transmission mechanism is attached substantially in parallel with a crankshaft like a main shaft and a counter shaft respectively attached substantially in parallel with the crankshaft. A gear position sensor that senses the shift stage selected by the shift drum is also attached to the side of the shift drum, that is, to the side of a crankcase (for example, refer to JP-A No. H7-230741). In addition, the shift drum is attached in the vicinity of the main shaft and the counter shaft. Therefore, the gear position sensor is arranged in the vicinity of a driving sprocket attached to the counter shaft.

SUMMARY OF THE INVENTION

When the gear position sensor is attached so that it is protrudes from the side of the crankcase as described above, mud, debris, etc. may adhere to the gear position sensor via a chain wound on the driving sprocket or a stone splashed from a front wheel may hit the gear position sensor. Therefore, a cover for protecting the gear position sensor is required to be provided to avoid this problem.

The present invention has been made in view of such a problem and an object of the present invention is to provide a splash guard mechanism of a gear position sensor for a motorcycle for protecting the gear position sensor without providing a special cover.

To address the problem, the splash guard mechanism of the gear position sensor for the motorcycle according to the present invention is used for an engine of a motorcycle where a gear position sensor that senses a shift stage selected by a shift drum protrudes sideways in the vicinity of a driving sprocket for driving a rear wheel by the side of a crankcase (for example, a left case half 5a in an embodiment) that holds a crankshaft, and is configured by a splash guard arranged between the gear position sensor and the driving sprocket and a rib protruding from the reverse side of the driving sprocket with the gear position sensor between them in the crankcase.

At this time, it is desirable that the splash guard be integrated with a sprocket cover that is attached to the side of the crankcase and covers the side of the driving sprocket. In addition, it is desirable that a groove be formed in a position opposite to the splash guard of the crankcase, and the splash guard be inserted into the groove.

When the splash guard mechanism of the gear position sensor for the motorcycle according to the present invention is configured as described above, a special cover for the gear position sensor is not required to be provided, the cost is reduced, and the assembly of the motorcycle can be simplified.

With the construction according to the present invention, the number of man-hours needed to attach the splash guard is not required by integrating the splash guard with the sprocket cover and the number of parts can be reduced. In addition, mud, debris, etc. splashed toward the gear position sensor can be securely prevented by forming the groove in the crankcase and inserting the splash guard into the groove.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the accompanying drawings, wherein the same reference numerals will be used to identify the same or similar elements throughout the several views.

Referring to the drawings, a preferred embodiment of the present invention will be described below. First, referring to FIG. 1, an engine 1 where a splash guard mechanism according to the present invention is used will be described. The engine 1 is applied to a motorcycle, particularly a sport motorcycle used for off road driving. In the following description, an arrow F shown in FIG. 1 points to the front of the motorcycle.

Figure 1:
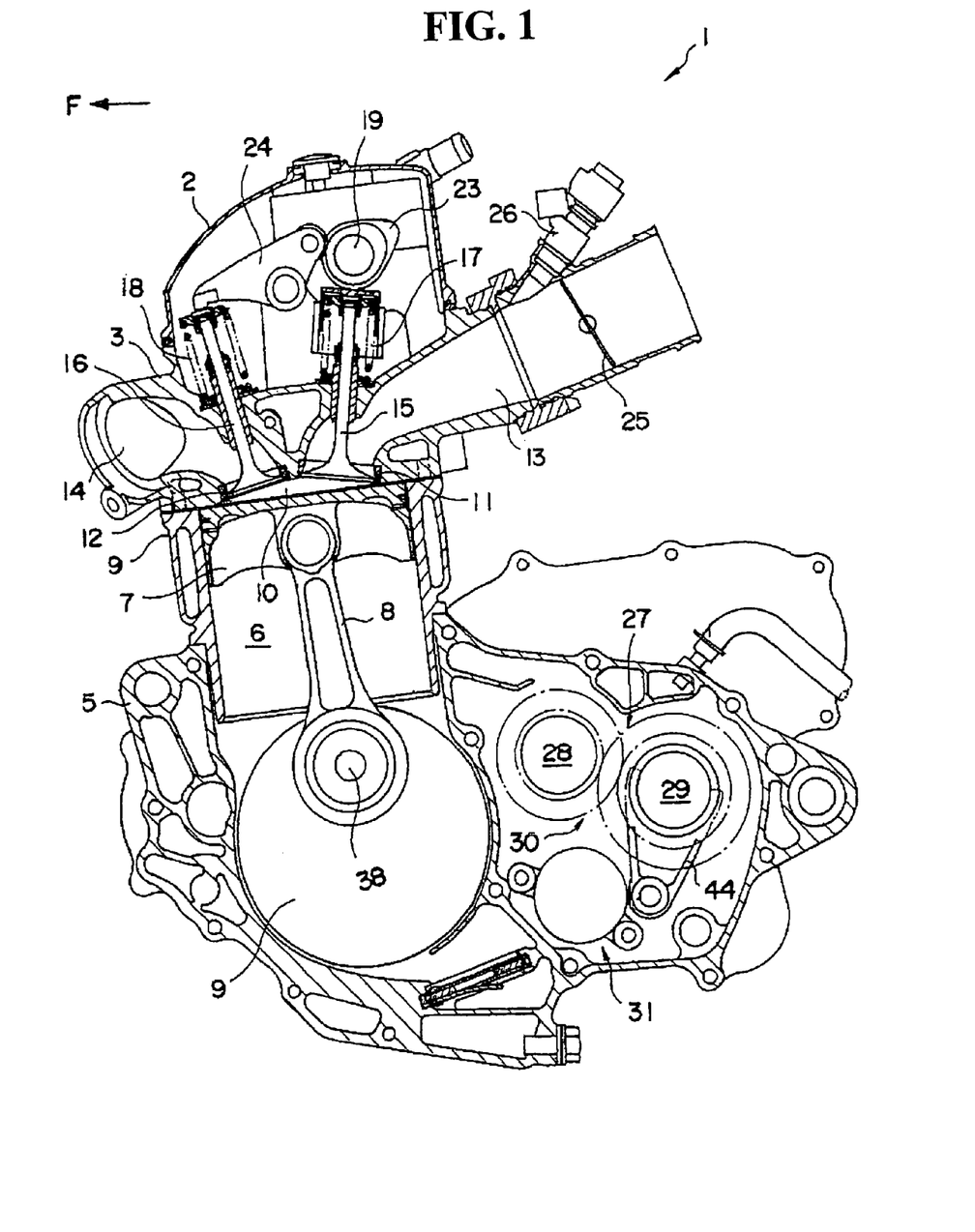
FIG. 1 is a side view in which an engine where a splash guard according to the invention is used is viewed from the left side.

The engine 1 is configured by a cylinder head cover 2, a cylinder head 3, a cylinder block 4 and a crankcase 5. A cylinder chamber 6 that extends vertically and cylindrically is formed in the cylinder block 4. In this cylinder chamber 6, a piston 7 is arranged so that the piston can be vertically slid and is connected to a crankshaft 9 rotatably held in the crankcase 5 via a connecting rod 8. The connecting rod 8 is connected to the crankshaft 9 by a crankpin 38. An intake port 13 and an exhaust port 14 communicate with a combustion chamber 10 formed by the cylinder chamber 6, the cylinder head 3 and the piston 7 via an inlet 11 and an outlet 12 respectively formed in the cylinder head 3. The respective one ends of an intake poppet valve 15 and an exhaust poppet valve 16 are attached to respective valve stems, are supported by respective retainers, and the respective other ends are pressed in directions in which the respective other ends ordinarily close the inlet 11 and the outlet 12 by respective valve springs 17, 18 respectively supported by the cylinder head 3.

Figure 2:
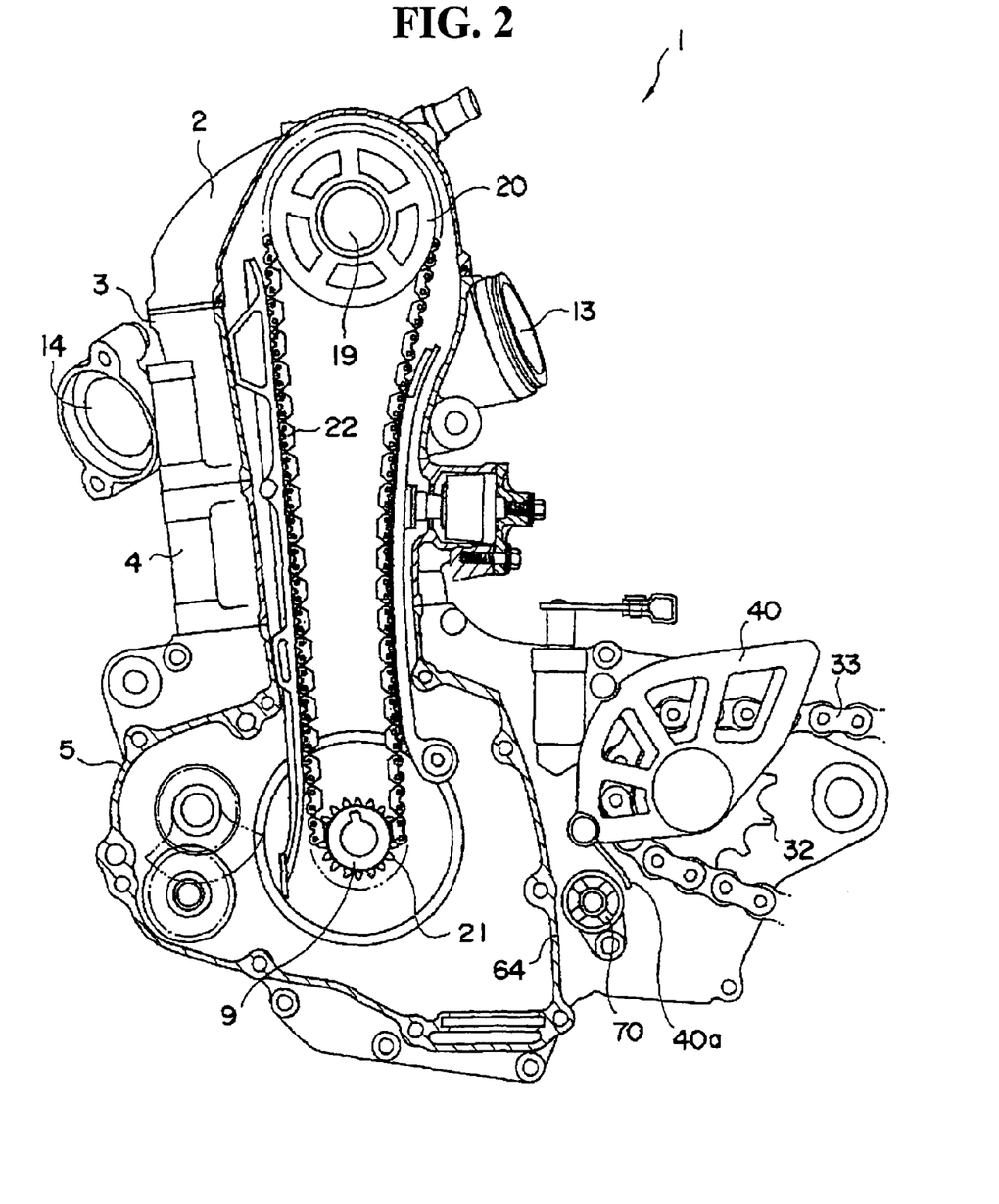
FIG. 2 is a left side view for explaining a cam driving mechanism of the engine.

Furthermore, a camshaft 19 that opens and closes the intake valve 15 and the exhaust valve 16 is rotatably supported by the cylinder head 3 and a timing change 22 is wound on a cam driven sprocket 20 arranged on the camshaft 19 and a cam driving sprocket 21 arranged on the crankshaft 9. Therefore, when the camshaft 19 is rotated in accordance with the rotation of the crankshaft 9 and a cam 23 formed on the camshaft 19 directly pushes down the intake valve 15 or pushes down the exhaust valve 16 via a rocker arm 24, the inlet 11 and the outlet 12 are opened or closed.

A throttle valve 25 and an injector 26 are attached to the intake port 13, the quantity of air cleaned by an air cleaner (not shown) that flows in is regulated by the throttle valve 25, the air is mixed with fuel injected from the injector 26, and they are supplied to the combustion chamber 10 via the inlet 11 from the intake port 13. After this air-fuel mixture is compressed by the piston 7, it is ignited by an ignition plug (not shown) and is combusted to generate energy for rotating the crankshaft 9 via the piston 7. Afterward, the air-fuel mixture is exhausted outside via the exhaust port 14 from the outlet 12 as exhaust gas.

Figure 3:
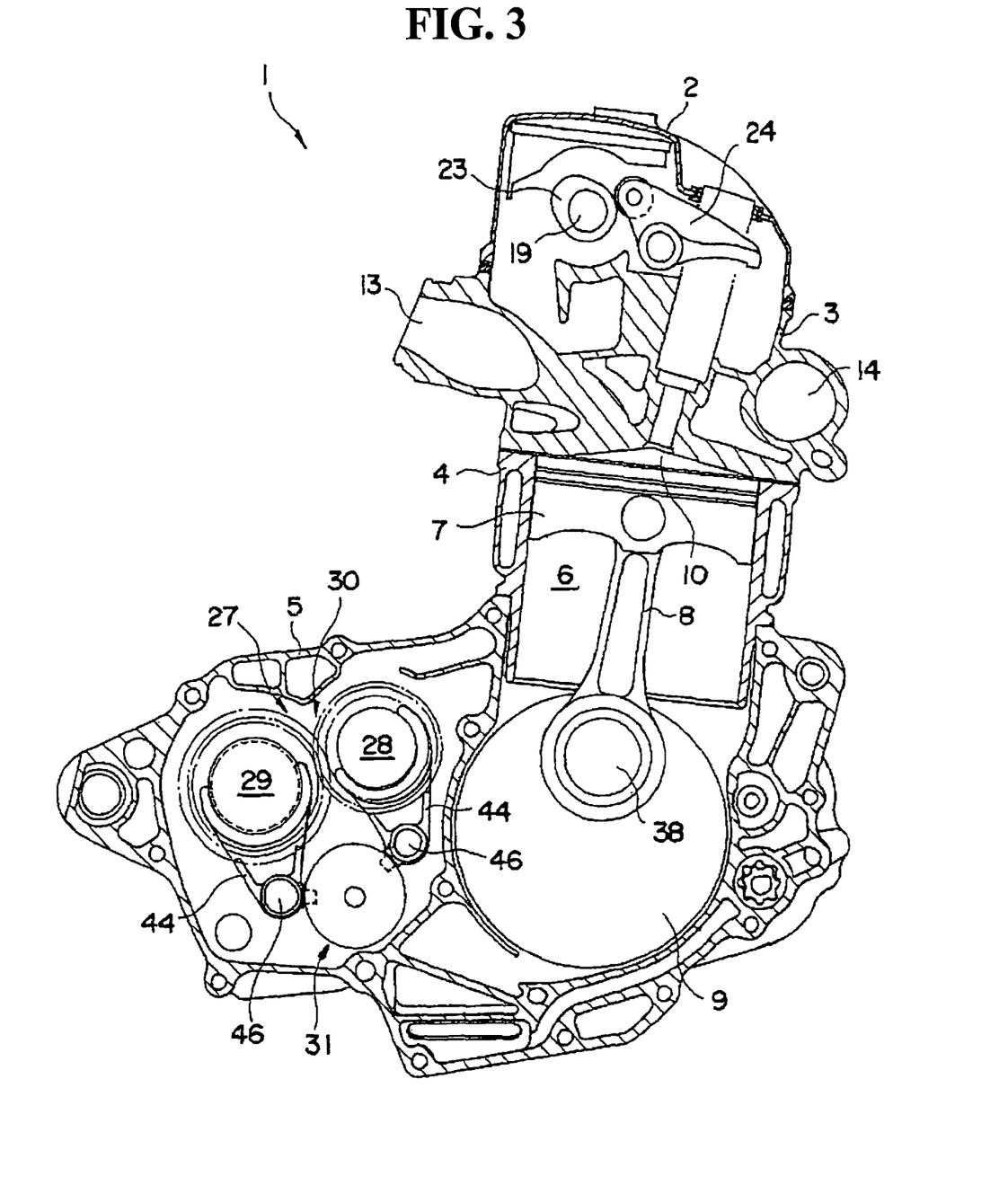
FIG. 3 is a right side view for explaining the arrangement of a main shaft, a counter shaft and a shift drum in the engine.
Figure 4:
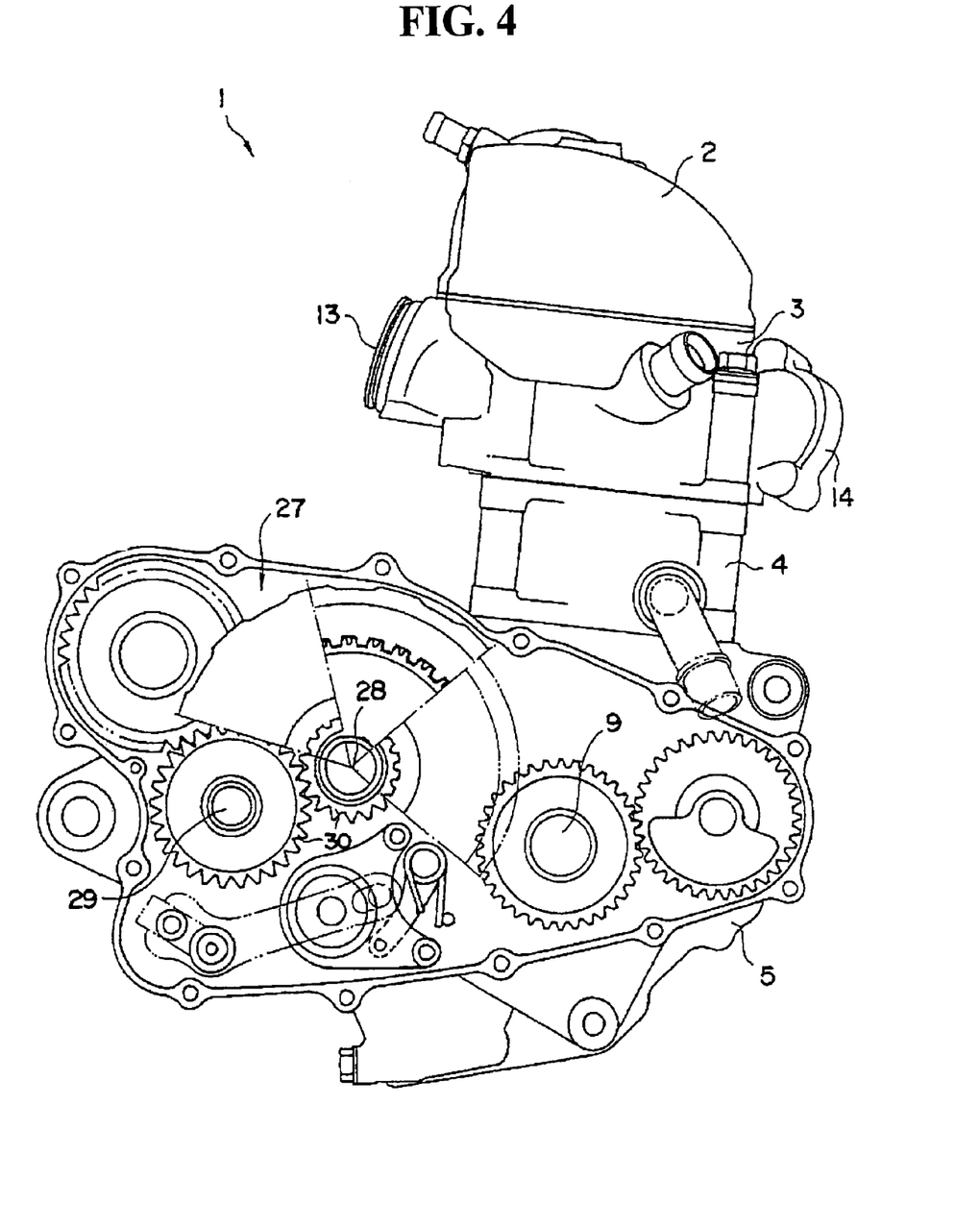
FIG. 4 is a right side view for explaining a transmission mechanism of the engine.

A transmission mechanism 27 is arranged at the back of the crankshaft 9 in the crankcase 5. The transmission mechanism 27 forms a parallel axes type transmission, and includes a main shaft 28 and a counter shaft 29 respectively arranged in parallel with the crankshaft 9 and respectively supported by the crankcase 5 so that they can be rotated, plural gear trains 30 arranged between the main shaft 28 and the counter shaft 29 and a shift drum 31 that engages and disengages gears configuring the gear train 30 with/from the main shaft 28 or the counter shaft 29 so as to shift the transmission gear ratio (shift stage) of the transmission mechanism 27. The rotation of the crankshaft 9 is transmitted to the main shaft 28 via a gear train not shown, is selected by the shift drum 31, and the rotation of the main shaft 28 is transmitted to the counter shaft 29 at the gear ratio of the gear trains 30 engaged with the main shaft 28 and the counter shaft 29.

The left end of the counter shaft 29 protrudes from the crankcase 5 outside and a driving sprocket 32 is attached to the left end. A chain 33 is wound on the driving sprocket 32 and a driven sprocket attached to a rear wheel shaft (not shown), a chain transmission mechanism is formed, and the rotation of the counter shaft 29 is transmitted to a rear wheel via the chain transmission mechanism.

Figure 5:
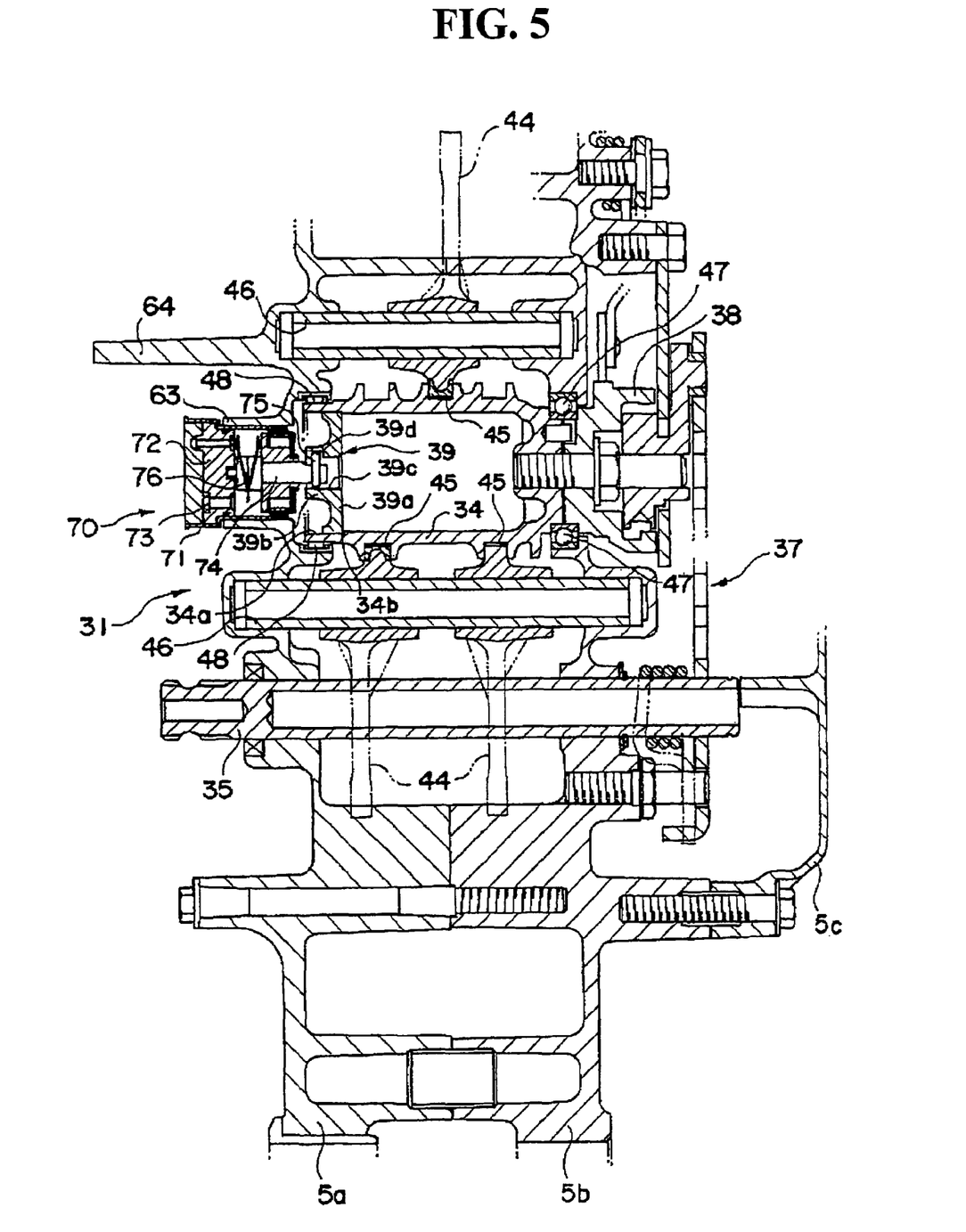
FIG. 5 is a plan showing a main part of the shift drum.

Referring to FIG. 5, the configuration of the shift drum 31 will be described. The shift drum 31 is configured by a shift drum body 34 which is cylindrical and the axis of which is arranged substantially in parallel with the crankshaft 9. An input shaft 35 is arranged substantially in parallel with the crankshaft 9 and rotatably supported by the crankcase 5. A change pedal 36 is attached to the left end of the input shaft 35. A transmission mechanism 37 transmits the rotation of the input shaft 35 to the shift drum body 34. An input member 38 inputs the rotation transmitted from the transmission mechanism 37 to the shift drum body 34. A lid member 39 is attached to an opening at the left end of the shift drum body 34. A shift fork 44 selects the shift stage of the transmission mechanism 27. A gear position sensor 70 is connected to the lid member 39 and senses the shift stage selected by the shift drum body 34.

Plural cam grooves 45 are formed on the outside face of the shift drum body 34 and the end of the shift fork 44 is fitted into each of the cam grooves 45. The shift fork 44 is fixed to the crankcase 5, is supported by a shift fork supporting shaft 46 extended substantially in parallel with the crankshaft 9 so that the shift fork can be slid laterally, and the end of the shift fork is connected to a dog clutch that engages and disengages the gear train 31 with/from the main shaft 28 or the counter shaft 29. Therefore, when the shift fork 44 is shifted laterally along the cam grooves 45 by stepping on the change pedal 36 and rotating the shift drum body 34 and the dog clutch is operated, the gear train 31 is engaged or disengaged with/from the main shaft 28 or the counter shaft 29 and shift stage can be selected.

In the engine 1 according to this embodiment, the crankcase 5 is configured by combining a left case half 5a and a right case half 5b as shown in FIG. 5. Furthermore, a left cover member 5d is attached so that the left side of the left case half 5a is covered (see FIG. 7), and a right cover member 5c is attached so that the right side of the right case half 5b is covered. The outside face at the right end of the shift drum body 34 is rotatably supported by the right case half 5b via a ball bearing 47. The outside face at the left end of the shift drum body 34 is rotatably supported by the left case half 5a via a needle bearing 48.

The above-mentioned input member 38 is coupled on the side of the right end of the shift drum body 34. The left end of the shift drum body 34 is open, an opening 34a is formed, and inside, the lid member 39 is connected. The lid member 39 is configured by a disc type flange 39a and a connected part 39b extended cylindrically from the center of the flange 39a. The inside diameter of the opening 34a on the side of the left end of the shift drum body 34 is formed in the substantially same size as the flange 39a of the lid member 39 and a stepped part 34b, the inside diameter of which is smaller than the opening 34a, is formed on the right side of a part supported by the needle bearing 48 of the shift drum body 34. The lid member 39 is press-fitted to the shift drum body 34 configured as described above from the opening 34a, is pushed to the stepped part 34b, and is fixed.

A cylindrical sensor mounting part 63 aligned with the axis of the shift drum body 34, protruded leftward and pierced laterally is formed in the left case half 5a that supports the left end of the shift drum body 34 and the gear position sensor 70 is inserted into the sensor mounting part 63.

The gear position sensor 70 is configured by a sensor case 71 including a terminal fixing part 71a having substantially the same size as the outside diameter of the cylindrical sensor mounting part 63 and a sensing element 71b having substantially the same size as the inside diameter of the sensor mounting part 63. A terminal base 72 is attached to the terminal fixing part 71a of the sensor case 71. Plural terminals 73 are attached to the terminal base 72. A rotating shaft 74 protrudes outside from the sensing element 71b of the sensor case 71 and is rotatably held in the sensing element 71. A fixing pin 75 is attached to the end of the rotating shaft 74 so that the fixing pin protrudes in a direction perpendicular to the rotation axis. A contact plate 76 is arranged inside the sensing element 71b and is rotated together with the rotating shaft 74.

An inserting groove 39d cut inside from the opening is formed at the left end of a through hole 39c pierced laterally (in a direction of the rotation axis) and formed in the connected part 39b of the lid member 39 attached to the shift drum body 34. The rotating shaft 74 of the gear position sensor 70 attached into the sensor mounting part 63 is inserted into the through hole 39c. The fixing pin 75 provided to the end of the rotating shaft 74 is inserted into the inserting groove 39d. The rotating shaft 74 and the lid member 39 are connected to each other. Therefore, as the rotating shaft 74 is rotated via the fixing pin 75 according to the rotation of the shift drum body 34 and a contact condition between the contact plate 76 and the terminal 73 changes, the shift stage selected by the shift drum 31 can be sensed by the gear position sensor 70 by sensing the rotational quantity of the shift drum body 34.

As described above, the shift drum that slides the shift fork 44 of the shift drum 31 is configured by the shift drum body 34 and the lid member 39 as different members. Therefore, the lid member 39 can be produced thin by a press and other means, can be lightened, and the strength required for connecting the gear position sensor 70 can be also secured. Since the shift drum body 34 has the opening 34a greatly open to the side of the left end, it can also be cast without using a core when an inside cavity is produced and can be manufactured at a low cost. The shift drum body 34 can be further lightened by machining the inside of the cavity. Therefore, the thickness of the respective members can be thinned, compared with a case that these are integrally cast, and the shift drum 31 can be lightened.

The periphery of the shift drum body 34 is supported by the needle bearing 48 on the side (the side of the left end) to which the rotating shaft 74 is connected in the shift drum body 34. Therefore, the bearing precision can be enhanced by the needle bearing 48. Furthermore, since the lid member 39 is press-fitted to the right side of a part supported by the needle bearing 48 (to the inside of the shift drum body 34) in the shift drum body 34, the connected part 39b of the lid member 39 is also located in the shift drum body 34. Therefore, the rotating shaft 74 of the gear position sensor 70 is also located in the shift drum body 34 and the lateral length of the whole shift drum 31 can be reduced.

Figure 6:
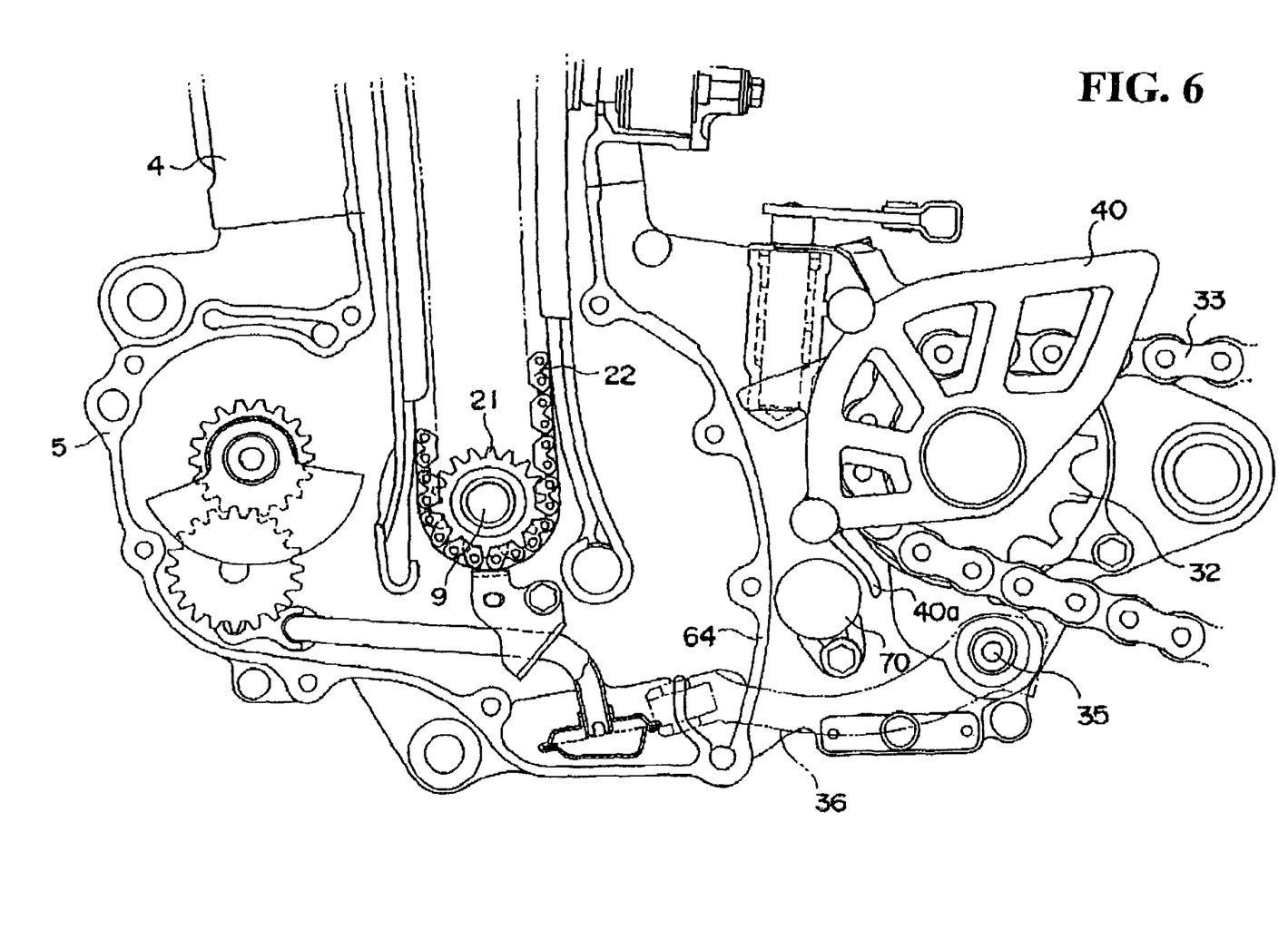
FIG. 6 is a left side view showing a main part for explaining the arrangement of a gear position sensor.

As shown in FIG. 1 and other figures, the shift drum 31 is arranged on the lower side between the main shaft 28 and the counter shaft 29. Therefore, the gear position sensor 70 is attached to the vicinity under the driving sprocket 32 attached to the left end of the counter shaft 29 as shown in FIG. 6. At this time, in a state in which the gear position sensor 70 is mounted in the sensor mounting part 63, the sensing element 71b of the sensor case 71 is inserted into the sensor mounting part 63 and the terminal fixing part 71a protrudes outside. Therefore, mud, debris, etc. that adheres to the chain 33 wound on the driving sprocket 32 are splashed and may adhere to the gear position sensor 70. Since the gear position sensor protrudes leftward from the crankcase 5 (the left case half 5a), a stone, etc. splashed by a front wheel may hit the sensor.

Figure 7:
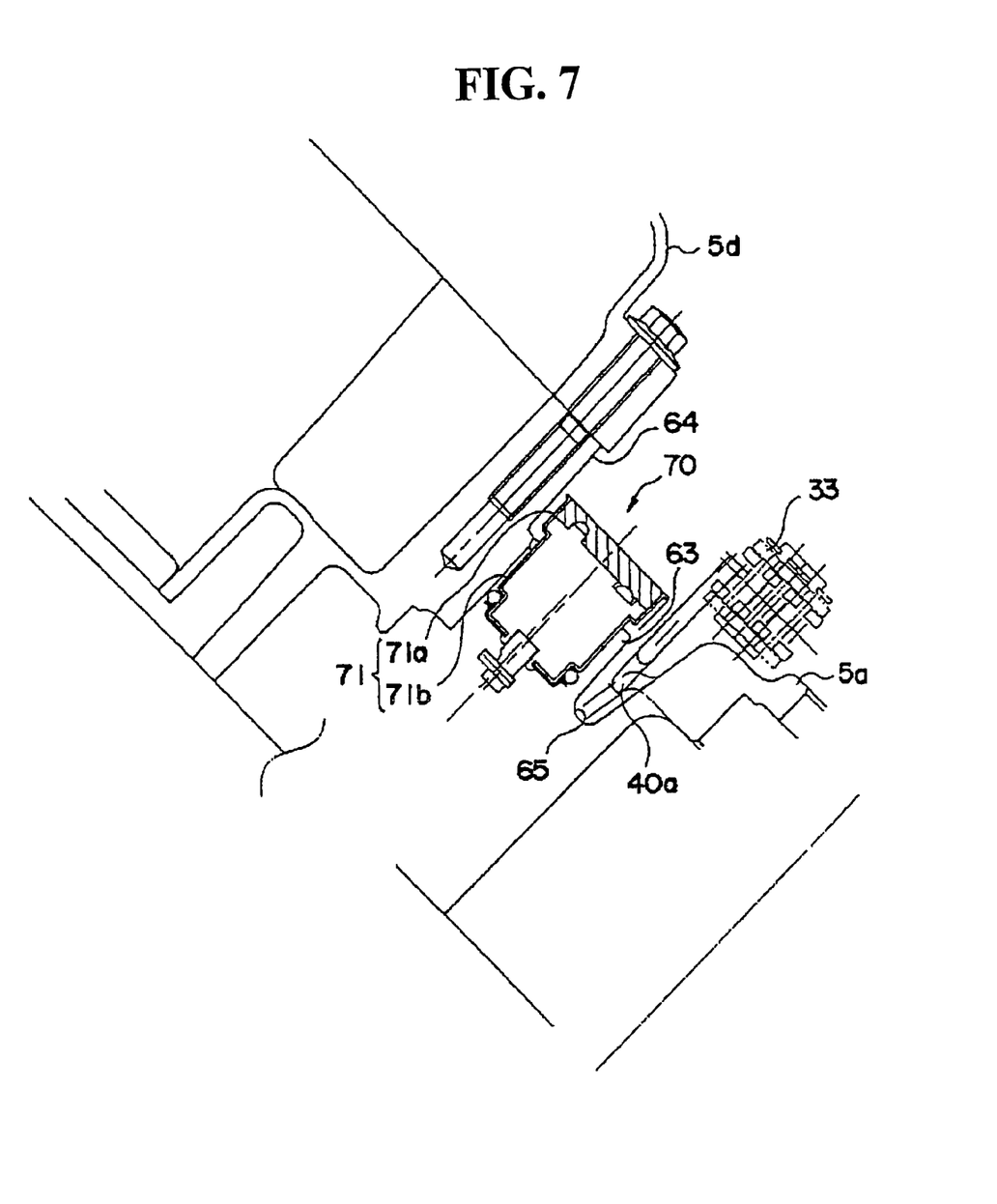
FIG. 7 is a sectional view showing a main part including the gear position sensor.

For a guard from mud splashed from the chain 33, first, a flat splash guard 40a is provided to a sprocket cover 40 attached to the left side of the crankcase 5 so that the sprocket cover covers the driving sprocket 32 so as to protect the driving sprocket 32. The splash guard 40a is located between the driving sprocket 32 (the chain 33) and the gear position sensor 70 when the sprocket cover 40 is attached to the crankcase 5 as shown in FIGS. 6 and 7. Since the splash guard 40a extends diagonally downward and backward from the upside, so that the splash guard covers the rear side of the gear position sensor 70 as shown in FIG. 6 and further, the end is curved downward, mud, debris, etc. splashed from the chain 33 drops downward along the splash guard 40a and never adhere to the gear position sensor 70.

At this time, a groove 65 is formed on the side of the sensor mounting part 63 of the left case half 5a and when the sprocket cover 40 is attached to the left case half 5a, the splash guard 40a enters the groove 65 as shown in FIG. 7. Therefore, since the splash guard 40a covers the whole side of the gear position sensor 70, mud, debris, etc. splashed from the chain 33 can be securely prevented from adhering to the gear position sensor 70.

It is also conceivable that a rib for the splash guard of the gear position sensor 70 is formed on the crankcase 5 and a crankcase cover (right and left cover members 5c, 5d). However, when the rib for the splash guard is broken, the whole crankcase or the whole crankcase cover is required to be replaced and the case has a defect in that it costs a great deal to replace the whole crankcases or the whole crankcase cover. Therefore, as described above in this embodiment, since the sprocket cover 40 only has to be replaced because the splash guard 40a is integrated with the sprocket cover 40, even if the splash guard 40a is broken, sprocket covers can be replaced at a relatively low cost.

In the meantime, a rib 64 for storing the cam driving sprocket 21 attached to the crankshaft 9 and other elements protrudes from the left side of the left case half 5a on the front side of the gear position sensor 70. The left cover member 5d is attached to the side of the left end of the rib 64. Therefore, since the front side of the gear position sensor 70 is covered with the rib 64 and the left cover member 5d in a front view, the gear position sensor 70 is protected from a stone, etc. splashed from the front wheel.

As described above, the gear position sensor 70 attached to the crankcase 9 is surrounded by the rib 64 formed in the left case half 5a and the splash guard 40a formed on the sprocket cover 40. Therefore, a special cover for the gear position sensor 70 is not required to be provided. In addition, additional man-hours for attaching the splash guard 40a is not required by forming the splash guard 40a on the sprocket cover 40 and the number of parts can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A splash guard mechanism of a gear position sensor for a motorcycle in an engine of the motorcycle, where the gear position sensor that senses a shift stage selected by a shift drum protrudes sideways in the vicinity of a driving sprocket for driving a rear wheel by a crankcase that holds a crankshaft, comprising:
   a splash guard arranged between the gear position sensor and the driving sprocket; and
   a rib protruding from the crankcase at a side of the gear position sensor opposite to the driving sprocket.

2. The splash guard mechanism of the gear position sensor for the motorcycle according to claim 1, wherein the splash guard is attached to a side of the crankcase, and the splash guard is integrated with a sprocket cover that covers a side of the driving sprocket.

3. The splash guard mechanism of the gear position sensor for the motorcycle according to claim 2, wherein a groove is formed in the crankcase at a position opposite to the splash guard, and the splash guard is inserted into the groove.

4. The splash guard mechanism of the gear position sensor for the motorcycle according to claim 2, wherein the rib is a portion of the crankcase that engages with a crankcase cover of the crankcase.

5. The splash guard mechanism of the gear position sensor for the motorcycle according to claim 2, wherein the splash guard extends diagonally downward and backward, the splash guard including an end that curves downward.

6. The splash guard mechanism of the gear position sensor for the motorcycle according to claim 1, wherein a groove is formed in the crankcase at a position opposite to the splash guard, and the splash guard is inserted into the groove.

7. The splash guard mechanism of the gear position sensor for the motorcycle according to claim 6, wherein the rib is a portion of the crankcase that engages with a crankcase cover of the crankcase.

8. The splash guard mechanism of the gear position sensor for the motorcycle according to claim 6, wherein the splash guard extends diagonally downward and backward, the splash guard including an end that curves downward.

9. The splash guard mechanism of the gear position sensor for the motorcycle according to claim 1, wherein the rib is a portion of the crankcase that engages with a crankcase cover of the crankcase.

10. The splash guard mechanism of the gear position sensor for the motorcycle according to claim 1, wherein the splash guard extends diagonally downward and backward, the splash guard including an end that curves downward.

11. A splash guard arrangement for a gear position sensor of a vehicle, comprising:
   a splash guard arranged between the gear position sensor and a driving sprocket of the vehicle; and
   a rib protruding from a crankcase of the vehicle at a side of the gear position sensor opposite to the driving sprocket.

12. The splash guard arrangement according to claim 11, wherein the splash guard is attached to a side of the crankcase, and the splash guard is integrated with a sprocket cover that covers a side of the driving sprocket.

13. The splash guard arrangement according to claim 12, wherein a groove is formed in the crankcase at a position opposite to the splash guard, and the splash guard is inserted into the groove.

14. The splash guard arrangement according to claim 12, wherein the rib is a portion of the crankcase that engages with a crankcase cover of the crankcase.

15. The splash guard arrangement according to claim 12, wherein the splash guard extends diagonally downward and backward, the splash guard including an end that curves downward.

16. The splash guard arrangement according to claim 11, wherein a groove is formed in the crankcase at a position opposite to the splash guard, and the splash guard is inserted into the groove.

17. The splash guard arrangement according to claim 16, wherein the rib is a portion of the crankcase that engages with a crankcase cover of the crankcase.

18. The splash guard arrangement according to claim 16, wherein the splash guard extends diagonally downward and backward, the splash guard including an end that curves downward.

19. The splash guard arrangement according to claim 11, wherein the rib is a portion of the crankcase that engages with a crankcase cover of the crankcase.

20. The splash guard arrangement according to claim 11, wherein the splash guard extends diagonally downward and backward, the splash guard including an end that curves downward.

* * * * *